United States Patent [19]

Mazur et al.

[11] Patent Number: 4,908,983

[45] Date of Patent: Mar. 20, 1990

[54] TREE INJECTOR

[75] Inventors: Gregory Mazur, Kent; Willard P. Frissell, Mentor-On-The-Lake, both of Ohio

[73] Assignee: The Davey tree Expert Company, Kent, Ohio

[21] Appl. No.: 166,562

[22] Filed: Mar. 9, 1988

[51] Int. Cl.[4] ............................................... A01G 29/00
[52] U.S. Cl. ....................................................... 47/57.5
[58] Field of Search .......................... 47/57.5, 48.5, 58; 417/521, 234; 222/275–277; 137/567; 239/269

[56] References Cited

U.S. PATENT DOCUMENTS

| | | | |
|---|---|---|---|
| 1,718,195 | 6/1929 | Rankin | 47/57.5 |
| 3,295,254 | 1/1967 | Schoonman | 47/57.5 |
| 3,316,817 | 5/1967 | Ellis | 92/79 |
| 3,780,943 | 12/1973 | Lilja | 239/269 |
| 3,834,075 | 9/1974 | Nix et al. | 47/57.5 |
| 3,992,813 | 11/1976 | Freshel | 47/57.5 |
| 4,144,673 | 3/1979 | Quast et al. | 47/57.5 |
| 4,505,067 | 3/1985 | Gillespie | 47/57.5 |
| 4,596,088 | 6/1986 | Graber | 47/57.5 |

FOREIGN PATENT DOCUMENTS 2509123  1/1983  France ................................ 47/57.5

OTHER PUBLICATIONS

TIS Enterprises, "Colt 75", Tree Injection System.
TIS Enterprises, "Stallion 75", Tree Injection System.
Springfield Specialties Co., Closed Injection System.
Arborchem Products Co., Arborchem Tree Injection Products.
Birchmeier & Co. Ltd., Birchmeier Commander.
Wilbur-Ellis APM Injector for Tree Growth Retardents.
Davey Tree Exp. Co. Manual for Inject. of Chemicals.

*Primary Examiner*—Robert A. Hafer
*Assistant Examiner*—Charles H. Sam
*Attorney, Agent, or Firm*—Watts, Hoffmann Fisher & Heinke

[57] ABSTRACT

An apparatus for injecting fluid under pressure into trees having a base and a plurality of cylinders supported by the base for receiving injection fluid. Each cylinder has a first end, a piston reciprocable in the cylinder for injecting fluid from the cylinder into a tree, an opening when the piston is moved to a position away from the first end of the cylinder, and an independent injector. Each cylinder also includes an actuator connected to the piston for moving the piston toward and away from the first end, and having an adjustor for selecting the amount of fluid to be injected. First and second conduits are connected to the first end of the cylinders. The first conduits are in communication with a reservoir of injection fluid and the second conduits are in communication with the injectors. A plurality of third conduits are also included, and are in communication with the cylinders when the piston is moved to a location away from the first end. The third conduits are in communication with the reservoir. A pump supported by the base for circulating injection fluid through the cylinders from the first conduit to the third conduit, to purge air from the cylinders and to fill the cylinders with injection fluid.

13 Claims, 4 Drawing Sheets

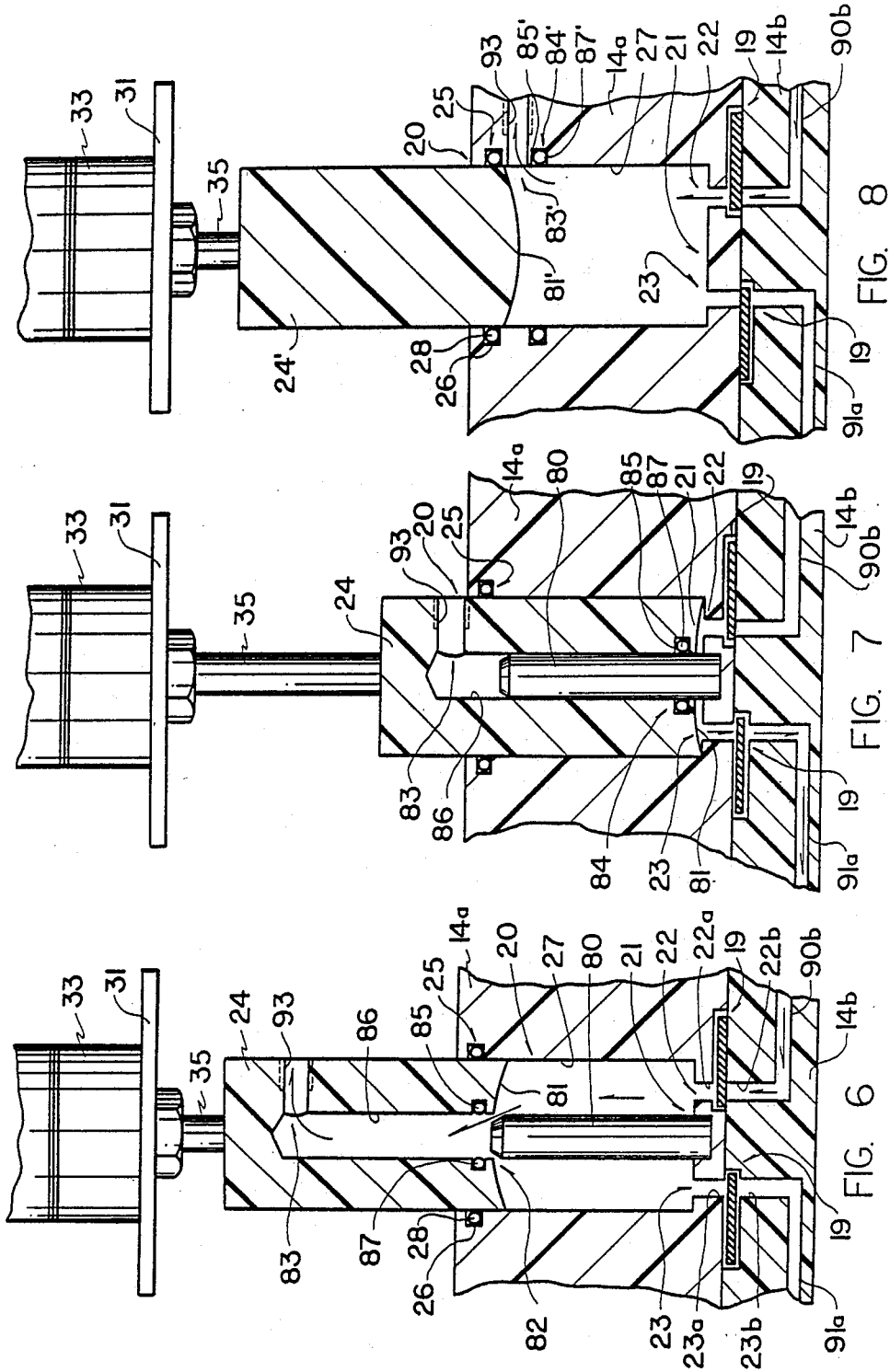

TREE INJECTOR

TECHNICAL FIELD

The present invention relates to an apparatus for injecting fluid, and more specifically to an apparatus for injecting fluid chemicals under pressure into trees.

BACKGROUND ART

Fluid chemicals are injected into trees to obtain a variety of advantages, such as feeding the tree, treating it with fungicides or insecticides, and for inhibiting its growth. Numerous devices have been available for the injection of such fluid substances into trees. In one such system, shown in U.S. Pat. No. 4,505,067, injection of fluid is provided using injectors connected with cylinders and a reservoir of liquid to be injected. Pistons within the cylinders are connected to an operating arm used to manually drive the pistons and inject the fluid.

Other systems provide injection of the fluid chemicals under pressure. U.S. Pat. No. 3,992,813, for example, discloses a treating system wherein fluid is introduced into a tree using a plurality of injectors connected via hose assemblies to a source of fluid to be injected and a portable source of pressure to force the liquid into the tree. One of the problems with such treatment systems has been controlling and monitoring the amount of fluid that is injected. Thus, for example, while the injection of a pre-measured tank of fluid chemicals seems to provide an adequate indication of the amount of fluid injected, air contained in the system often disguises the true measure of the substance injected.

In the past, systems with multiple injectors have also been unable to operate independently. Such systems required all of the injectors to be empty before any could be refilled. Since different portions of a tree often accept fluid at different rates, the operator of such systems could not refill each injector as it was emptied. Instead, the operator was forced to wait for all injectors to empty, at which time the unit could be refilled and injection operations continued.

A further problem with prior pressurized tree injection systems, has been the difficulty in transporting such systems to the site of the tree to be injected. Another problem has been the inability of such systems to inject variable amounts of fluids, depending on the tree size or the type of chemical required to be injected. Such systems have also failed to inject the desired amount of fluid on a continuing basis. If, for example, an operator desired to repeatedly inject a non-standard volume of fluid which required adjustment of the injector, readjustment to the desired volume setting was required prior to each of the repeated injections.

DISCLOSURE OF THE INVENTION

In accordance with this invention, an improved device is provided for injecting fluid chemicals under pressure into trees that provides effective and repeatable measurement of variable amounts of fluid to be injected, through the use of a pump for purging air from the device and for completely filling each cylinder of the device prior to injection of fluid. The device provides for independent operation of each cylinder so that injection from each cylinder is performed regardless of the status of injection from other cylinders. The device also includes a compact construction for ease of transportation to the injection site.

A device for injecting fluid under pressure in accordance with the present invention comprises an injection portion, a reservoir of injection fluid, and a pressure source. The injection portion preferably includes a plurality of cylinders supported by a base, and pistons reciprocable within the cylinders for injecting fluid. Each of the cylinders has a first end and an opening when the piston is moved away from the first end.

First and second conduits are provided in communication with the first end of each of the cylinders. The first conduit is in communication with a reservoir of the fluid to be injected. The second conduit is in communication with an injector which is in the tree. A third conduit is also provided in communication with each of the cylinder openings and the fluid reservoir. A pump, which is also supported by the base, circulates injection fluid through each of the cylinders from the first conduit to the third conduit to purge air from the cylinders and to fill the cylinders with fluid to be injected.

In the preferred embodiment of the present invention, the pump includes a priming cylinder in the base having a pump inlet communicating with the reservoir of injection fluid and a pump outlet communicating with the first conduits. A reciprocable priming piston is also provided within the priming cylinder for pumping injection fluid to the cylinders, and includes a handle member connected to the piston for manual movement thereof.

The invention further provides actuators connected to each of the pistons for movement toward and away from the first end of the cylinders. The actuators are preferably double acting reciprocable pneumatic cylinders having reciprocable pistons and drive rods connected to each of the pistons. Each actuator includes an adjustment knob for adjusting the stroke length of the actuator and correspondingly adjusting the amount of fluid to be injected from the associated cylinder. An indicator is provided on each actuator, is fixed relative to the adjusting knob, and enables visual inspection of the amount of fluid to be injected from each cylinder. Once the adjustor is moved to the desired volume of fluid, the selected volume will continue to be injected upon refilling of the cylinder, unless a different volume is selecting using the adjustor.

The above and other features and advantages of the invention will become better understood or apparent from the following detailed descriptions of two preferred embodiments of the invention, which are described with reference to the accompanying drawings.

BRIEF DESCRIPTION OF THE DRAWINGS

FIGS. 6 and 7 are partial sectional views, with the actuator shown in elevation, of the cylinder and piston of one embodiment of the present invention in positions away from and toward the first end of the cylinder, respectively; and FIG. 8 is a partial sectional view, with the actuator shown in elevation, of the cylinder and piston of a second embodiment of the present invention in a position away from the first end of the cylinder.

BEST MODE FOR CARRYING OUT THE INVENTION

Figure 1:
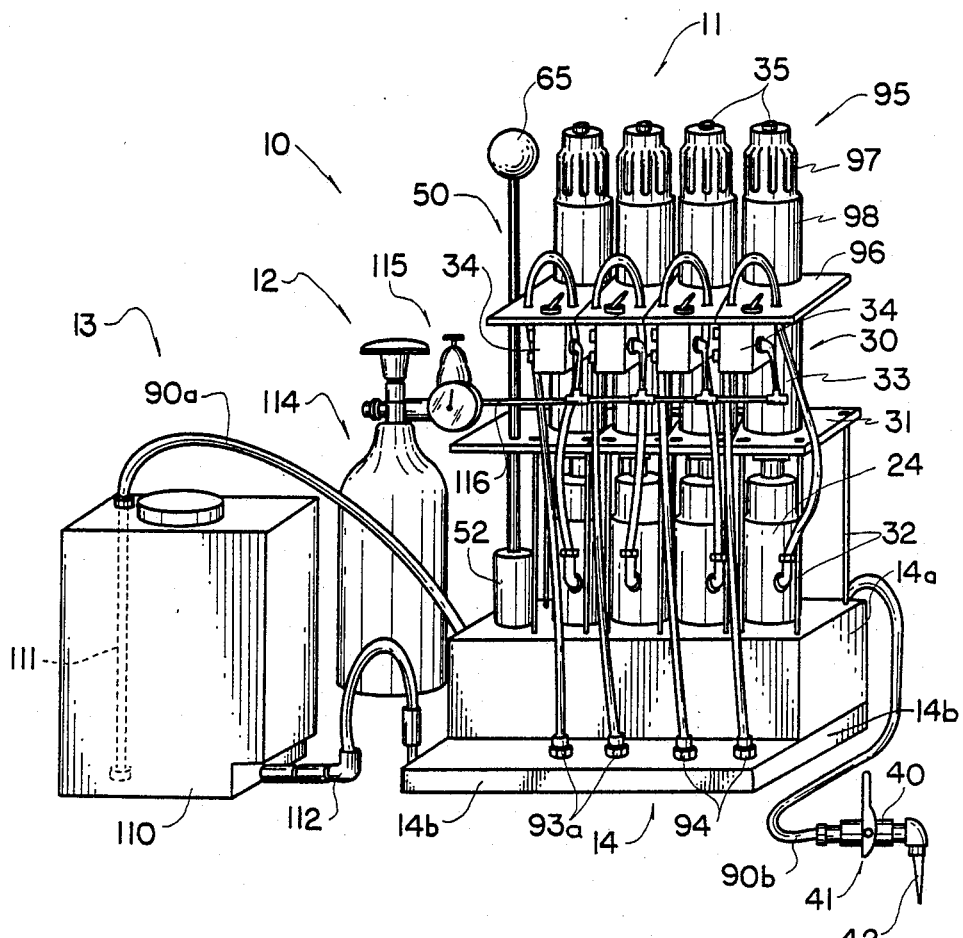
FIG. 1 is a perspective view of a device for injecting fluid into trees made in accordance with the present invention.

Referring to FIG. 1 of the drawings, a preferred embodiment of the present invention for injecting fluid under pressure into a tree is generally designated by reference character 10. The device includes a reservoir of injection fluid 13, a pressure source 12, and an injection portion 11.

The reservoir 13 is best illustrated in FIG. 1, and includes a tank 110 for holding injection fluid, a filter 111 connected to injection portion 11 via suction tubing 90a. A recycle line 112 is also provided to return injection fluid from the injection portion 11 to the tank 110, and connects the injection portion to the tank.

The pressure source 12 provided is also illustrated in FIG. 1, and includes a conventional tank of pressurized gas 114, such as carbon dioxide, a pressure gauge regulator 115, and a feed line 116 in communication with the injection portion 11.

The injection portion 11 of the device 10 includes a base 14, a plurality of injection cylinders 20 supported by the base, a pump 50 supported by the base 14 for circulating injection fluid under pressure through the cylinders 20 to purge air from the cylinders and to fill them with injection fluid, a plurality of actuators 30 each associated with one of the cylinders, and a plurality of injectors 40. As the construction and operation of each cylinder, actuator and associated injector is identical, detailed descriptions of only one of each of the mechanisms will be provided to avoid duplication. The singular references to certain elements is intended to extend to each of the plurality of identical elements.

Figure 3:
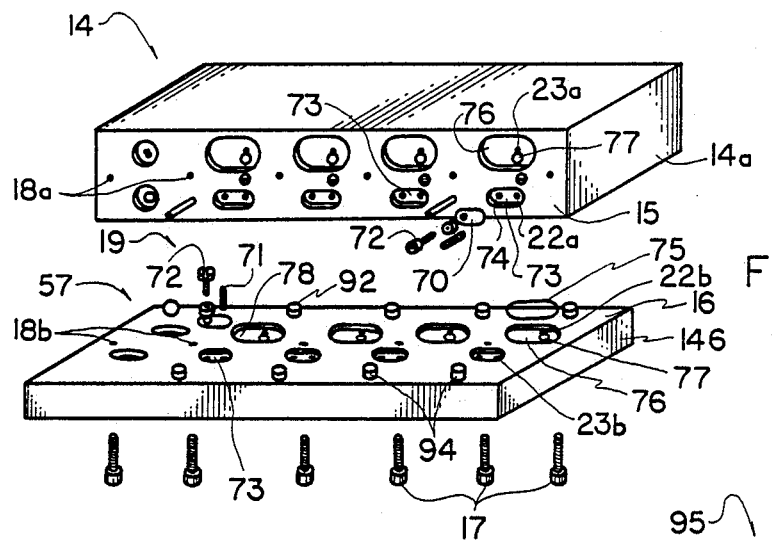
FIG. 3 is a partial exploded view of the base.

As shown in FIG. 3, the base 14 includes an upper portion 14a and a lower portion 14b. The upper and lower base portions are connected by threaded fasteners 17 which engage both portions of the base at connecting apertures 18a and 18b. When in the assembled condition as in FIG. 1, the upper and lower portions are in communication along cooperating engagement surfaces 15 and 16.

A plurality of conventional one-way valves 19, as in FIG. 3, are positioned between the cooperating surfaces to control the flow of injection fluid to the pump 50 and between each of the cylinders 20 and conduit carrying injection fluid in the lower base portion. In the illustrated embodiment, each cylinder 20 includes a first end 21 having an inlet 22 for carrying injection fluid to the cylinder, and an outlet 23 for carrying fluid to be injected to the associated injector 40. A one-way cylinder valve is associated with the first end of each cylinder at the inlet 22 and outlet 23.

The cylinder valves each include a flap 70, a spring 71, a fastener 72, and an O-ring seal 75. The flap 70 is positioned within a groove 73. As shown in FIG. 3, the plurality of flap and groove combinations are located in the portion of the base opposite the direction of fluid flow. Each of the flaps is between portions of the inlet in the upper and lower base, 22a and 22b, respectively, and portions of the outlet in the upper and lower base, 23a and 23b, respectively. Thus, as illustrated, each flap and groove is in the upper base portion 14a when the flow of injection fluid is into the associated cylinder via the inlets 22b, 22a, 22, and in the lower base portion 14b when the flow of injection fluid is out of the associated cylinder via the outlets 23, 23a, 23b.

Each flap is secured in its respective groove by the fastener 72 engaged within the aperture 74 in the groove. The spring 71 engages the flap and the base portion opposite the groove 73, to bias the flap to a closed position covering the associated inlet 22 or outlet 23. A plurality of seal grooves 76 are located in the base portion opposite from, and associated with, the grooves 73. Each of the grooves 76 includes a spring abutment surface 77 for engaging the spring, and a seal abutment surface for engaging the O-ring seal 75. When in the assembled condition, the O-ring seals prevent leakage of injection fluid.

Figure 2:
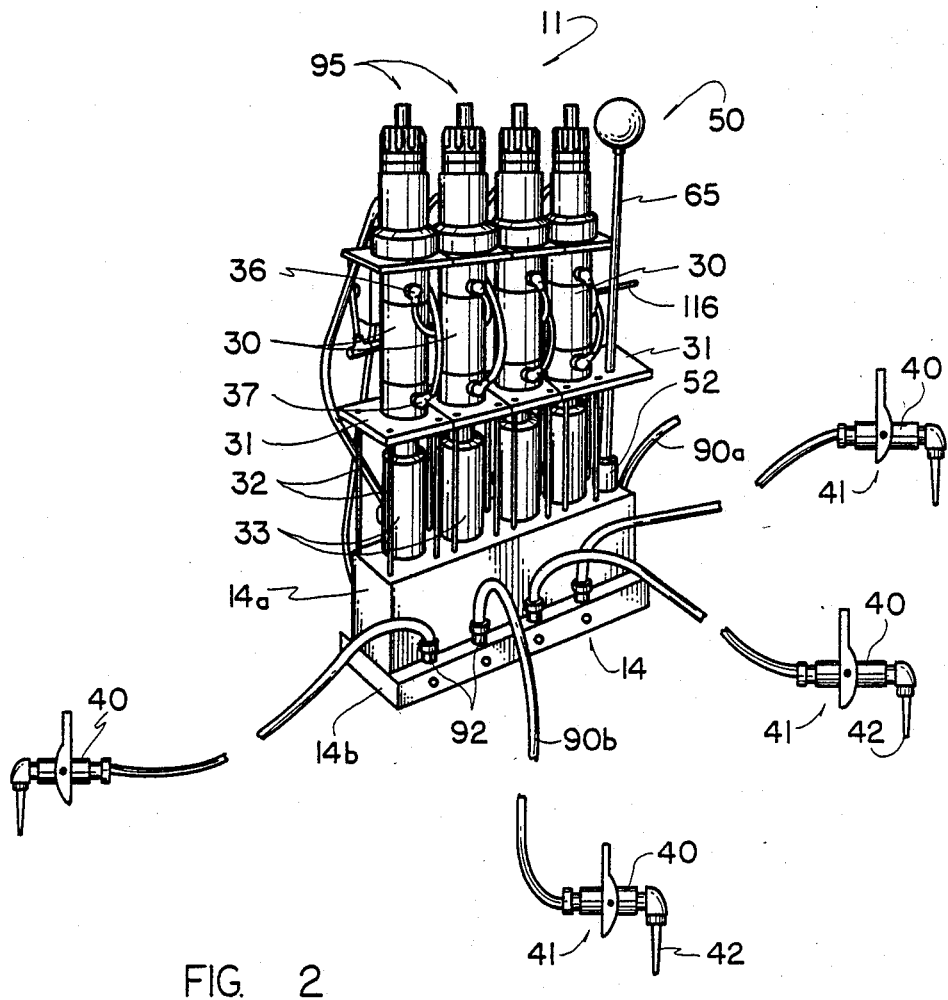
FIG. 2 is a perspective view of the rear of the injection portion of the device shown in FIG. 1.

The lower base portion 14b is provided with conduit 90 connecting the injection fluid reservoir with the cylinder inlets 22, and conduit 91 connecting the cylinder outlets 23 with the injector 40. As partially illustrated in FIGS. 1 and 6 to 8, the conduit comprises tubing 90a extending from the reservoir to an opening (not illustrated) in the lower base portion, and bore 90b in the lower base. The bore 90b is connected to inlets to each of the cylinders 22b, 22a, 22. Similarly, conduit 91 connects the outlets 23, 23a, 23b from each of the cylinders, and comprises bore 91a through the lower base portion to an outlet 92 in the lower base portion, and tubing 91b connecting each of the outlets with an associated injector 40. As shown in FIG. 1, the illustrated embodiment includes a single injector 40. FIGS. 2 and 3 illustrate an embodiment of the invention wherein each bore 91a is connected to a separate outlet 92 having tubing 91b attached thereto and extending to each of the injectors 40.

The base 14 is preferably made of Delrin TM, which is a trademark for an acetal resin of composition $(-OCH_2-)_n$ derived by polymerization of formaldehyde. Delrin TM is available from E. I. Du Pont de Nemours & Co., Inc. Because Delrin TM, which expands and absorbs fluid under pressure, is used as the base material, each of the cylinders 20 and actuators 30 is supported by separate mounting plates 31 and 96, respectively.

As shown in FIGS. 1 and 5 to 8, each of the cylinders 20 is supported in the upper base portion 14a, and includes an injection piston 24, reciprocable in the cylinder for injecting fluid therefrom. A seal 25 is located between the cylinder and piston to prevent leakage of injection fluid from the cylinder. The seal includes an annular groove 26 in the cylinder wall 27 and an annular seal member 28 for engagement with the groove and piston.

Figure 5:
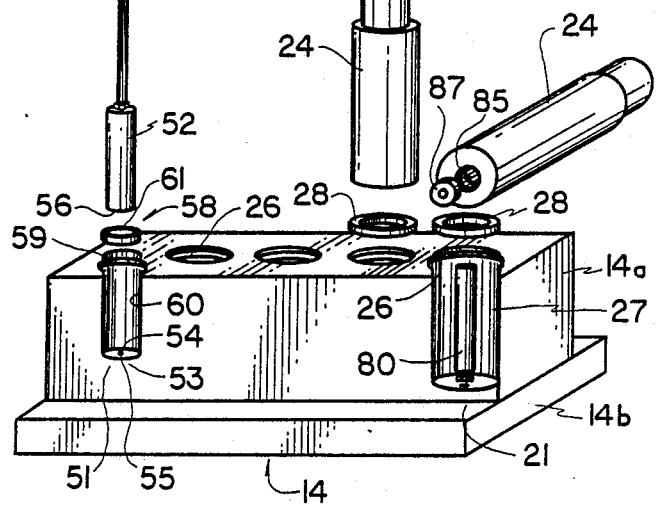
FIG. 5 is a partial exploded view of one embodiment of the device of the present invention.

Referring to the embodiment of the cylinder and piston shown in FIGS. 5 to 7, the piston 24 includes a first end 81, a bore 82 extending in the direction of piston reciprocation, and an opening 83 in the bore away from the piston first end and in communication with the reservoir 13. As illustrated in FIGS. 6 and 7, the piston first end 81 is preferably of a concave configuration for better flow.

The cylinder 20 includes a post 80 engaged in the upper base portion at the first end of the cylinder 21, and constructed to fit within the bore and of a length to be received within the bore when the piston is adjacent the cylinder first end 21. When the piston is moved to a position away from the cylinder first end as shown in FIG. 6, the opening 83 can receive injection fluid for return to the reservoir. When the piston is moved toward the first cylinder end, as shown in FIG. 7, the cylinder post is received within the piston bore and a seal 84, is formed at the piston first end between the piston and the post. The seal includes an annular groove 85 in the piston bore wall 86 and an annular seal member 87 for engagement with the groove and piston.

Referring to the embodiment of the cylinder and piston shown in FIG. 8, the piston 24' includes a first end 81', and an opening 83, in communication with the reservoir and in the upper base portion away from the cylinder first end. As illustrated, the piston first end 81' is preferably of a convex configuration for better flow. When the piston is moved to a position away from the first cylinder end as shown, the opening 83' can receive injection fluid for return to the reservoir. When the piston is moved toward the first cylinder end, a seal 84' is formed between the piston and cylinder. The seal includes an annular groove 85' in the cylinder wall 27 and an annular seal member 87' for engagement with the piston.

In both embodiments of the cylinder and piston combinations shown in FIGS. 5–7 and 8, each of the openings 33, 33' is connected to a third conduit 93 which carries injection fluid to the reservoir. In the embodiment of FIGS. 5–7, the conduit is connected to tubing 93a which extends from the pistons, as shown in FIG. 1, in an upward direction through associated mounting plates 96, and back down toward the base for engagement with an associated inlet 94 in the lower base portion 14b. Each inlet is connected to a bore (not illustrated) in the lower base portion, which is in turn connected to the recycle line 112.

In the case of the embodiment of FIG. 8, the opening is connected to a conduit 93 in the upper base portion which returns the injection fluid to the recycle line 112.

The pump 50 of the present invention is illustrated in FIGS. 1 and 5, and includes a priming cylinder 51 supported in the upper portion of the base 14a, and a priming piston 52 reciprocable in the priming cylinder. The priming cylinder includes a first end 53 having a pump inlet 54 for carrying injection fluid to the priming cylinder and in communication with the reservoir 13 via conduit or tubing 90a. A pump outlet 55 is also provided for carrying injection fluid from the pump, and is in communication with each of the cylinder inlets via conduit 90b. The priming piston includes a first end 56 and a handle member 65 spaced from the first piston end for manually reciprocating the priming piston.

Conventional one-way valves, as shown in FIG. 3, are also included in the pump between the base cooperating surfaces 15, 16, to control the flow of injection fluid into and out of the priming cylinder. The illustrated valves are ball check valves 57. A seal 58 is provided between the priming cylinder and priming piston to prevent leakage of injection fluid from the priming cylinder. The seal includes an annular groove 59 in the cylinder wall 60 and an annular seal member 61 for engagement with the groove and priming piston.

The actuators 30 of the present invention are conventional double acting reciprocable pneumatic actuators. As shown in FIGS. 1 and 2, each of the actuators is associated with an injection cylinder 20 for injecting fluid therefrom. The actuators are supported in independent mounting plates 31 attached to the base 14 by rods 32 secured to the plates. Each of the actuators includes a drive cylinder 33 having a drive piston (not illustrated) reciprocable therein, and a switch 34 connected with the feed line 116 of the pressure source 12 having a load position and an inject position.

As shown in FIG. 3, each of the cylinders 33 includes upper 36 and lower 37 inlets for receiving pressurized gas from the pressure source and thereby reciprocate the drive piston. When the switch 34 is in the load position, pressurized gas enters the cylinder 33 to reciprocate the drive piston in a direction moving the injection piston 24 away from cylinder first end 21. When in the inject position, the switch 34 enables movement of the injection piston toward the first cylinder end 21.

The drive piston is connected on both ends by a drive rod 35. As shown in FIG. 5, the drive rod 35 is attached to the injection piston 24 on one end, and to an adjustor 95 on the other end.

Figure 4:
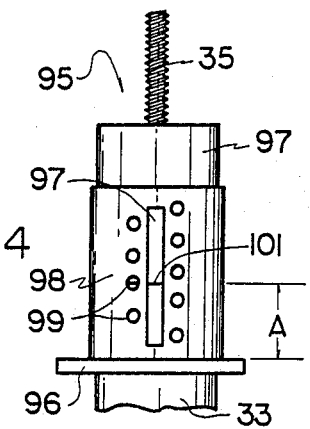
FIG. 4 is an elevational view of the adjustor.

The adjustor 95 enables adjustment of the stroke length of the actuator, and corresponding selection of the amount of fluid to be injected. As best illustrated in FIG. 4, each adjustor 95 is supported on an independent mounting plate 96 attached to an end of the drive cylinder 33 spaced from the injection cylinder. The adjustor includes a knob 97, a cap member 98 is secured to the mounting plate 96, is fixed relative to the knob, and has indicium 99 thereon representing the amount of fluid to be injected, and mating helical surfaces (not illustrated) supporting the knob on the drive rod for axial rotation thereof. Thus, when the knob is adjusted as in FIG. 5, the bottom edge of the knob 97, as seen through the cap 98, is aligned with indicia 99 representing a specific amount of fluid to be injected. The adjusted stroke length is, for the example shown in FIG. 4, less than the full stroke length by the distance indicated at reference character A. Once the knob is adjusted to the desired volume, the selected volume will continue to be injected upon each refilling of the associated cylinder, until the knob is again adjusted.

Injectors 40 are connected with tubing 91b having a length enabling use of the injectors at a location spaced from the base 14. Each of the conduit tubings 91b is connected to an associated outlet 92 in the lower base portion. The injectors each include on-off valves 41 for selectively operating the injectors, and an injector tip 42 adapted to be forced into a hole in a tree.

Operation of the device of the present invention is initiated by first closing the valves 41 of the injectors 40. The actuator switches 34 are then moved to a load position, whereupon application of force from the pressure source 12 operates the actuators 30 to drive the injector pistons to the load position, or the position away from the first end of the cylinders shown in FIGS. 6 or 8. It should again be noted that to inject the amount of fluid desired at the rate desired, any number of the injection cylinders may be used independently during the injection operation by selective operation of the actuator switches and injector valves associated with each cylinder.

Once the injection pistons 24 are in the load position, the pump 50 is operated by manual reciprocation of the handle member 65 to fill the pump with fluid from the reservoir 13. Fluid is then circulated from the pump to the conduit 90 and the cylinders 20, as partially shown by the fluid flow lines in FIGS. 6 and 8. Operation of the pump and circulation of the fluid continues until air is purged from the system and the cylinders are full, as indicated by the return of fluid to the tank 110 through the recycle line 112, a portion of which is transparent.

Once fluid is returned to the tank, the injectors are inserted into one or a number of holes drilled into the tree to be injected. If a specific pressure level is desired for injection of the fluid, the regulator should be adjusted to the desired setting. The actuator switches 34 are then moved to the inject position. Application of force from the pressure source operates the actuators 30 and drives the injector pistons 24 to the position toward the first end of the cylinders shown in FIG. 7.

The movement of the injection pistons 24 circulates the fluid to be injected through the outlets 23, 23a, 23b, and conduit 91a, 91b, as partially shown by the fluid flow lines in FIG. 7, to the injectors 40. When the injector valves 41 are moved to the open position, fluid is injected into the tree. Additional fluid can be injected by repeating the steps previously mentioned.

When injection is completed, the injectors are removed from the tree, and a valve on the pressure source is moved to a closed position.

From the description of the preferred embodiments of the invention disclosed herein it is apparent that a new and improved device for injecting fluid under force into trees is provided. The device provides effective measurement of different selected amounts of fluid to be injected through the use of a pump for purging air from the device and completely filling either one or several of the cylinders of the device prior to injection of fluid. The device is also compact in construction for ease of transportation in a carrying case (not illustrated) to the injection site. Repair and maintenance of the device is also easy to accomplish.

While the preferred embodiments of the invention have been described in considerable detail, it will be apparent that certain modifications or alterations can be made therein without departing from the spirit and scope of the invention set forth in the appended claims.

I claim:

1. An apparatus for injecting fluid under pressure into trees comprising,
   a base,
   a cylinder supported by the base for receiving injection fluid,
   a piston reciprocable in the cylinder for injecting fluid from the cylinder into a tree,
   first and second conduits in communication with a first end of the cylinder, the first of said conduits for communicating with a reservoir of injection fluid and the second of said conduits for communicating with an injector outlet,
   means providing an opening in the cylinder when the piston is moved to a location away from the first end and a third conduit communicating with said opening for communicating with said reservoir,
   a pump for circulating injection fluid through the cylinder from the first conduit to the third conduit, to purge air from the cylinder and to fill the cylinder with injection fluid, and
   an actuator connected to said piston for moving the piston toward and away from the first end.

2. An apparatus as set forth in claim 1 including a bore within the piston extending in the direction of piston reciprocation, a post within the cylinder constructed to fit within the bore and of a length to be received within the bore when the piston is adjacent said first end, means forming a seal between the piston and post when the piston is moved toward said first end, and wherein said means providing said opening comprises the bore.

3. An apparatus according to claims 1 or 2 wherein said pump includes a priming cylinder supported by said base, a priming piston reciprocable in the priming cylinder and having a handle member for manual movement of the priming piston, said priming cylinder having a fluid inlet for communicating with said reservoir of injection fluid and a fluid outlet for communicating with the first end of the cylinder.

4. An apparatus according to claim 3 wherein said actuator comprises a double acting reciprocable pneumatic actuator having a drive rod connected to said piston.

5. An apparatus according to claim 4 wherein said actuator includes means for adjusting actuator stroke length, said means comprising an adjusting knob, mating helical surfaces supporting the knob on said drive rod for axial rotation to adjust the stroke length and corresponding adjustment of the amount of fluid to be injected, and a member fixed relative to said adjusting knob having indicium of the amount of fluid to be injected.

6. An apparatus according to claim 5 wherein a plurality of cylinders are supported by the base, each cylinder having an independent injector and actuator, and wherein each actuator is separately and independently supported on said base by associated mounting plates.

7. An apparatus according to claim 6 wherein said base is made of an acetal resin of a formaldehyde polymer.

8. An apparatus for injecting fluid under pressure into trees comprising,
   a base,
   a plurality of cylinders supported by the base for receiving injection fluid, each cylinder having a first end, and a piston reciprocable in the cylinder for injecting fluid from the cylinder into a tree, said piston having a bore extending in the direction of piston reciprocation,
   each of said cylinders also having a post within the cylinder constructed to fit within the bore and of a length to be received within the bore when the piston is adjacent the first end, means forming a seal between the piston and post when the piston is moved toward said first end, an independent injector, and an actuator, wherein each actuator is connected to said piston for moving the piston toward and away from the first end,
   a plurality of first and second conduits each in communication with the first end of one of the cylinders, the first conduits for communicating with a reservoir of injection fluid and the second conduits for communicating with said injector,
   a plurality of third conduits each in communication with the bore of one of the cylinders when the piston is moved to a location away from the first end, the third conduits for communicating with said reservoir, and
   a pump supported by the base for circulating injection fluid through the cylinders from the first conduit to the third conduit, to purge air from the cylinders and to fill the cylinders with injection fluid.

9. The apparatus of claim 8 wherein said base supports a plurality of mounting plates for independently and separately supporting the actuators of said cylinders.

10. The apparatus of claim 9 wherein said pump includes a priming cylinder in said base, a priming piston reciprocable in the priming cylinder and having a handle member for manual movement of the priming piston for pumping fluid to the cylinders, said priming cylinder having a first end with a pump inlet for communicating with said reservoir of injection fluid, a pump outlet for communicating with said first conduits, a one way valve at the pump inlet permitting fluid flow from the reservoir to the priming cylinder, and a one way valve at the pump outlet permitting fluid flow from the priming cylinder to the first conduits.

11. The apparatus of claim 10 wherein a one way valve permitting fluid flow from the reservoir to the cylinder via the pump is provided intermediate the first conduit and the first end of the cylinder, and a one way valve permitting fluid flow from the cylinder to the injector is provided intermediate the second conduit and the first end of the cylinder.

12. An apparatus according to claim 11 wherein said base is made of an acetal resin of a formaldehyde polymer.

13. A method for injecting fluid under pressure into a tree comprising the steps of:

moving an injection piston in a cylinder to a position away from a first end of the cylinder, operating a pump in communication with a reservoir of fluid to circulate injection fluid through a fluid inlet in said first cylinder end and an opening formed in the cylinder when the piston is moved to the position away from the first cylinder end, thereby purging air from the cylinder and filling the cylinder with injection fluid, moving the injection piston under force in said cylinder to a position toward said first cylinder end, and forcing said injecting fluid from the cylinder through a fluid outlet to an injector in a tree.

* * * * *